(12) United States Patent
Jung et al.

(10) Patent No.: US 8,194,773 B2
(45) Date of Patent: Jun. 5, 2012

(54) APPARATUS AND METHOD FOR TRANSMITTING FEEDBACK INFORMATION IN COMMUNICATION SYSTEM

(75) Inventors: Sung-Yoon Jung, Seoul (KR);
Sang-Boh Yun, Seongnam-si (KR);
Sung-Soo Hwang, Yongin-si (KR);
Jong-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 855 days.

(21) Appl. No.: 12/284,922

(22) Filed: Sep. 26, 2008

(65) Prior Publication Data

US 2009/0086840 A1 Apr. 2, 2009

(30) Foreign Application Priority Data

Sep. 28, 2007 (KR) .................. 10-2007-0098436

(51) Int. Cl.
*H04L 5/12* (2006.01)
*H04L 27/28* (2006.01)
(52) U.S. Cl. .................. 375/267; 375/262; 455/69
(58) Field of Classification Search .................. 375/260, 375/267, 299, 347, 262; 455/69, 101, 500; 700/53
See application file for complete search history.

(56) References Cited

U.S. PATENT DOCUMENTS

| | | | |
|---|---|---|---|
| 2007/0280386 A1* | 12/2007 | Waes et al. | 375/347 |
| 2007/0281746 A1* | 12/2007 | Takano et al. | 455/562.1 |
| 2008/0285667 A1* | 11/2008 | Mondal et al. | 375/260 |
| 2008/0304464 A1* | 12/2008 | Borkar et al. | 370/342 |

OTHER PUBLICATIONS

Tarkesh Pande, David J. Love and James V. Krogmeier "On Some Techniques for Reducing the Feedback Requirement in Precoded MIMO-OFDM", Purdue University, 2006, IEEE.*
David J.Love and Robert W. Heath, "Limited Feedback Unitary Precoding for Spatial Multiplexing Systems", Purdue University, The University of Texas, Aug. 2005, IEEE.*
Hua Zhang, "Orthogonal Frequency Division Multiplexing for Wireless Communications", Doctor of Philosophy in Electrical and Computer Engineering, Georgia Institute of Technology, Nov. 11, 2004.*
Jianzhong (Charlie) Zhang, Anthony Reid, Kiran Kuchi, Nico Van Waes, Victor Stolpman, IEEE C802.16e-05/008, Closed-Loop MIMO Precoding with CQICH Feedbacks, Nokia, Jan. 10, 2005.*
Ludovic Collin, Olivier Berder, Philippe Rostaing and Gilles Burel, "Optimal minimum distance-based precoder for MIMO spatial multiplexing systems", Brest, France, Mar. 2004, IEEE.*
Jihoon Choi , Robert W. Heath, "Interpolation based unitary precoding for spatial multiplexing MIMO-OFDM with limited feedback", Samsung Electronics and The University of Texas at Austin, 2004, IEEE.*

* cited by examiner

*Primary Examiner* — Aristocratis Fotakis

(57) ABSTRACT

Disclosed is a system and method for transmitting feedback information in a communication system. A receiver calculates a minimum distance of each two symbol vectors among all symbol vectors which can be received through a $k^{th}$ subcarrier among a plurality of subcarriers, in which a channel state of the $k^{th}$ subcarrier and a $j^{th}$ precoder among precoders included in a codebook set are applied; calculates sums of minimum distances by adding minimum distances calculated for the plurality of subcarriers according to each precoder; determines a precoder corresponding to a value greatest among the sums of minimum distances calculated according to the precoders, as a precoder representing the plurality of subcarriers; and feeds the feedback information including a precoder index of the determined precoder back to a transmitter.

20 Claims, 1 Drawing Sheet

APPARATUS AND METHOD FOR TRANSMITTING FEEDBACK INFORMATION IN COMMUNICATION SYSTEM

CROSS-REFERENCE TO RELATED APPLICATION(S) AND CLAIM OF PRIORITY

This application claims priority to application entitled "Apparatus And Method For Transmitting Feedback Information In Communication System" filed with the Korean Intellectual Property Office on Sep. 28, 2007 and assigned Serial No. 2007-98436, the contents of which are incorporated herein by reference.

TECHNICAL FIELD OF THE INVENTION

The present invention relates to a communication system and, more particularly, to an apparatus and method for transmitting feedback information in a communication system which employs a multiple input multiple output (MIMO) scheme.

BACKGROUND OF THE INVENTION

In the current communication system, extensive research is being conducted into a high quality multimedia service capable of transmitting mass data at a high speed. Different from wired channel environments, wireless channel environments existing in such a communication system include several factors, such as multipath interference, shadowing, propagation attenuation, time-varying noise, interference, and so forth, all of which cause communication errors in the communication system. Accordingly, a receiver receives data which is seriously distorted from data actually transmitted from a transmitter because the factors have been reflected in the data, and such a distortion degrades the performance of the entire communication system.

One of the technologies proposed to solve the performance degradation problem in the communication system is a multiple input multiple output (MIMO) technology. The MIMO communication system can obtain a full diversity gain and a full rate gain by using a transmit antenna diversity scheme. According to the transmit antenna diversity scheme, transmission gain is determined depending on channel states, and on whether the transmission path of a transmission antenna corresponds to an open loop or a closed loop.

According to the open-loop MIMO communication system, a transmitter estimates the data reception quality of a receiver, calculates transmission power, and transmits data with the calculated transmission power. According to the closed-loop MIMO communication system, generally, a transmitter receives a feedback of data reception quality from a receiver through a feedback channel, calculates transmission power by taking the fed-back data reception quality into consideration, and transmits data with the calculated transmission power.

Meanwhile, when receiving data from a transmitter in the closed-loop MIMO communication system, a receiver feeds back information about reception quality of the received data to the transmitter through a feedback channel. Especially, in a closed-loop MIMO communication system based on an orthogonal frequency division multiplexing (OFDM) scheme, since information about reception quality is fed back for every subcarrier, the amount of reception quality information to be fed back is large, and such a large amount of reception quality information significantly increases the overhead of an uplink.

However, when the amount of resources for the feedback channel is restricted in the closed-loop MIMO communication system, the receiver cannot transmit proper feedback of reception quality information according to each subcarrier. As a result, the transmitter cannot receive proper feedback of reception quality information according to each subcarrier, so that the transmitter inaccurately calculates transmission power, and transmits data to the receiver according to the inaccurately calculated transmission power. As described above, when the amount of reception quality information is greater than the amount of resources for the feedback channel, the performance of the closed-loop MIMO communication system is degraded.

SUMMARY OF THE INVENTION

To address the above-discussed deficiencies of the prior art, it is a primary object of the present invention to solve the above-mentioned problems occurring in the prior art, and provide an apparatus and method for efficiently transmitting feedback information in an OFDM-based closed-loop MIMO communication system in such a manner as to feed back a precoder index, instead of feeding back information about reception qualities in units of subcarriers, thereby minimizing the amount of feedback information, so that the degradation of system performance can be minimized when the amount of resources for feedback channels is limited.

In accordance with an aspect of the present invention, there is provided a method for transmitting feedback information by a receiver in a communication system, the method including the steps of: calculating a minimum distance of each two symbol vectors among all symbol vectors which can be received through a $k^{th}$ subcarrier among a plurality of subcarriers, in which a channel state of the $k^{th}$ subcarrier and a $j^{th}$ precoder among precoders included in a codebook set are applied; calculating sums of minimum distances by adding minimum distances calculated for the plurality of subcarriers according to each precoder; determining a precoder corresponding to a value greatest among the sums of minimum distances calculated according to the precoders, as a precoder representing the plurality of subcarriers; and feeding the feedback information including a precoder index of the determined precoder back to a transmitter.

In accordance with another aspect of the present invention, there is provided an apparatus for transmitting feedback information in a communication system, the apparatus including: a determination unit for calculating a minimum distance of each two symbol vectors among all symbol vectors which can be received through a $k^{th}$ subcarrier among a plurality of subcarriers, in which a channel state of the $k^{th}$ subcarrier and a $j^{th}$ precoder among precoders included in a codebook set are applied, calculating sums of minimum distances by adding minimum distances calculated for the plurality of subcarriers according to each precoder, and determining a precoder corresponding to a value greatest among the sums of minimum distances calculated according to the precoders, as a precoder representing the plurality of subcarriers; and a transmission unit for feeding the feedback information including a precoder index of the determined precoder back to a transmitter.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawing, in which like reference numerals represent like parts.

DETAILED DESCRIPTION OF THE INVENTION

Figure 1:
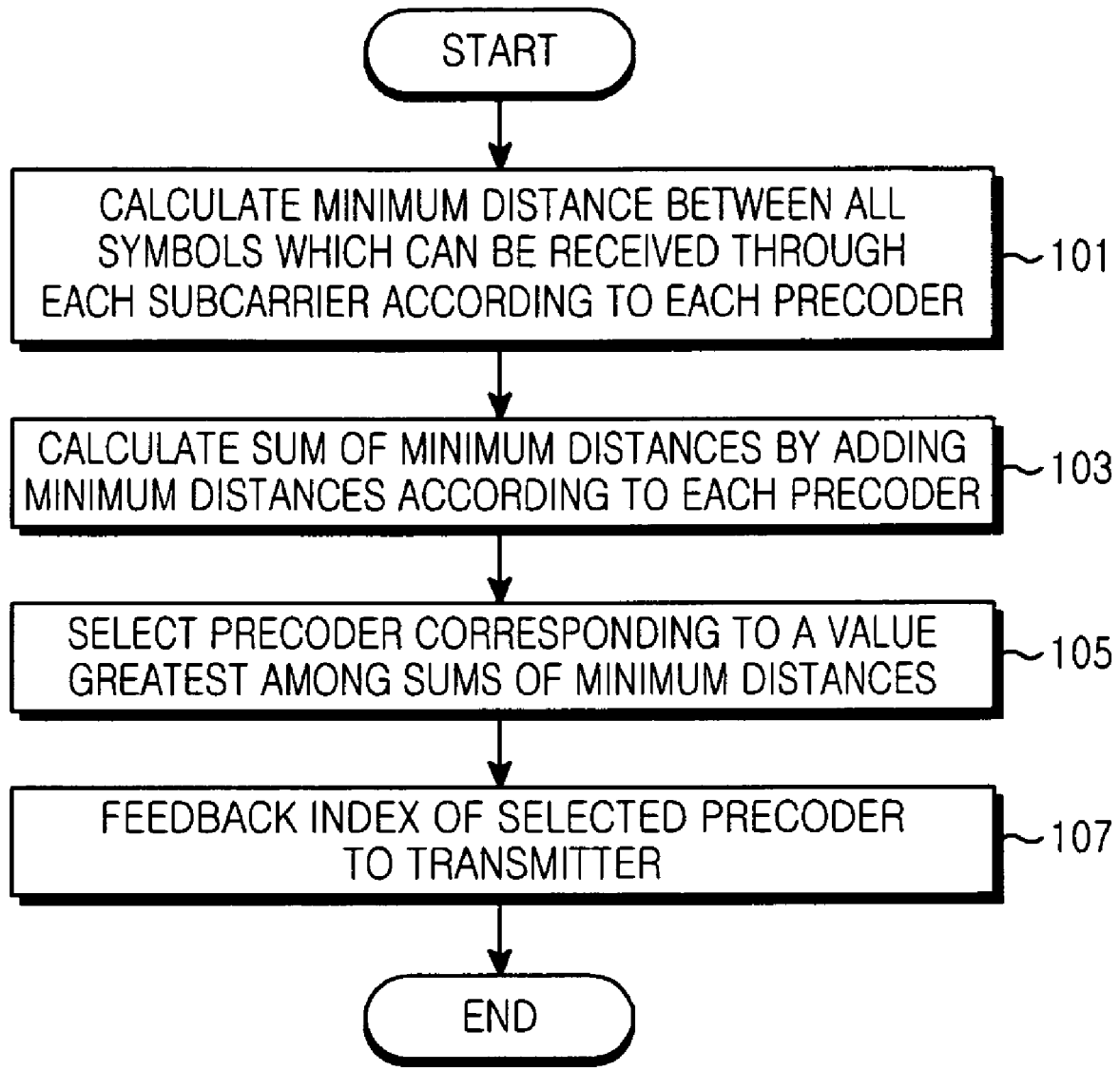
FIG. 1 is a flowchart illustrating a method for transmitting feedback information by a receiver in an OFDM-based closed-loop MIMO communication system according to an exemplary embodiment of the present invention.

FIG. 1 discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present invention proposes an apparatus and method for transmitting/receiving feedback information in a multiple input multiple output (MIMO) communication system.

First of all, a method of transmitting feedback information from a receiver to a transmitter in a general closed-loop MIMO communication system based on the OFDM scheme will be described. Equation 1 below represents a reception vector corresponding to a $K^{th}$ subcarrier received by a receiver in an M×N closed-loop MIMO communication system based on a codebook.

$$y_k = H_k F_k s_k + n_k, k=1,\ldots,K. \quad [\text{Eqn. 1}]$$

In Equation 1, "$y_k$" represents an N×1 reception vector of a $k^{th}$ subcarrier, "$H_k$" represents an M×N MIMO channel matrix of the $k^{th}$ subcarrier, and "$s_k$" represents an (M×1)$^{th}$ transmission symbol vector of the $k^{th}$ subcarrier. "$F_k$" represents an M×K unitary matrix of the $k^{th}$ subcarrier, and corresponds to a preceding matrix (i.e., a precoder), which is selected from a codebook set $F=\{F^1, F^2, \ldots, F^1\}$. In addition, "$n_k$" represents an N×1 noise vector of the $k^{th}$ subcarrier, "M" represents the number of antennas of the transmitter, and "N" represents the number of antennas of the receiver.

In a closed-loop MIMO communication system using Equation 1, a precoder selection scheme is generally achieved by using a linear receiver, wherein a precoder maximizing the minimum signal-to-noise ratio (SNR) among SNRs corresponding to S number of streams is selected. The precoder selection scheme may be expressed as Equation 2.

$$F_k = \underset{F^i \in F}{\operatorname{argmax}} SNR_{min} \quad [\text{Eqn. 2}]$$
$$= \underset{F^i \in F}{\operatorname{argmax}} \underset{1 \leq s \leq S}{\min} SNR_s.$$

In Equation 2, "$SNR_s$" represents an SNR of an $s^{th}$ stream.

Meanwhile, when a maximum-likelihood (ML) receiver, instead of the linear receiver, is used in the closed-loop MIMO communication system, a precoder selection scheme may be expressed as Equation 3.

$$F_k = \underset{F^j \in F}{\operatorname{argmax}} \underset{s_k^1 \neq s_k^2}{\min} \|H_k F^j (s_k^1 - s_k^2)\|_2. \quad [\text{Eqn. 3}]$$

"$H_k$" represents an M×N MIMO channel matrix of a $k^{th}$ subcarrier, and "$s_k^1$" represents a (k×1)$^{th}$ transmission symbol vector of the $k^{th}$ subcarrier.

Appropriate precoders representing the respective subcarriers are selected by the aforementioned manner in the closed-loop communication system, and the precoder indexes representing the selected precoders are transmitted to the transmitter through a feedback channel. However, as the total number of subcarriers "k" increases, the amount of precoder indexes to be fed back increases. Ultimately, an increase in the amount of feedback information causes an overhead in the uplink.

In order to minimize such an overhead, an interpolation method is used. According to the interpolation method, a receiver selects a plurality of subcarriers among the entire subcarriers and feeds back precoder indexes corresponding to the selected subcarriers, instead of feeding back precoder indexes according to the entire subcarriers, and a transmitter estimates a channel state by performing an interpolation on the fed-back precoder indexes. Also, a clustering method in which a receiver generates a plurality of clusters by grouping the entire subcarriers by a plurality of subcarriers, selects representative precoder indexes according to the clusters, and feeds back the selected precoder indexes is used. Hereinafter, the interpolation method and the clustering method will be described in detail.

1. Interpolation Method (1) Precoder Interpolation Scheme using Singular Value Decomposition (SVD)

According to the scheme, when two adjacent pilot precoders are determined to be $F_{k_0}$ and $F_{k_1}$, a transmitter interpolates a subcarrier existing between the pilot precoders by using Equation 4 below.

$$\hat{F}_{tmp} = tF_{k_0} + (1-t)F_{k_1} \, t \in [0,1]$$
$$\hat{F}_{tmp} = UDV^H \quad [\text{Eqn. 4}]$$
$$\hat{F}_k = UV^H$$

As shown in Equation 4, precoder $\hat{F}_{tmp}$ which has been subjected to a linear interpolation, is subjected to an SVD, so that unitary precoder $\hat{F}$ corresponding to a $k^{th}$ subcarrier is finally generated.

(2) Geodesic-Based Precoder Interpolation Scheme

According to the scheme, when two adjacent pilot precoders are determined to be $F_{k_0}$ and $F_{k_1}$, a transmitter interpolates a subcarrier existing between the pilot precoders in such a manner as to perform an interpolation on a precoder matrix according to the shortest distance on a codeword space which is constructed in a unitary precoder matrix, which is expressed as Equation 5 below.

$$\hat{F}_k = F_{k_0} \exp(t \cdot S) t \in [0,1]$$

where $$M = F_{k_0}^{-1} F_{k_1} = A \exp(S_\Sigma) A^{-1} = \exp(S = A S_\Sigma A^{-1}) \quad [\text{Eqn. 5}]$$

That is, a transmitter generates a unitary matrix "M," generates a diagonal matrix "S" by performing an eigen value decomposition (EVD) on the unitary matrix "M," and finally generates a unitary precoder $\hat{F}$ for a $k^{th}$ subcarrier by using the generated diagonal matrix "S."

2. Clustering Method (1) Constant Clustering Scheme and Median Clustering Scheme According to the constant clustering scheme, a receiver selects one of predetermined subcarriers in order to determine a precoder index representing a cluster from an existing clustering-based algorithm, and determines an optimal precoder index corresponding to the selected subcarrier to be the precoder index that represents the corresponding cluster.

Also, according to the median clustering scheme, a precoder index having a median value among precoder indexes determined as above is determined to be a precoder index that represents a corresponding cluster.

(2) Karcher Mean Clustering

According to the Karcher mean clustering scheme, a receiver selects optimal precoder indexes corresponding to all subcarriers in a cluster, calculates geodesic distances between the selected precoder indexes and precoders included in a codebook set, and determines a precoder producing the smallest sum of calculated distances, as a precoder representing the corresponding cluster. The Karcher mean clustering scheme may be expressed as Equation 6 below.

$$F^i = \underset{F \in F}{\operatorname{argmin}} \sum_{k \in Cluster\, i} d_{geo}^2(F, F_k) \quad [\text{Eqn. 6}]$$

As shown in Equation 6, "$d_{geo}(F_a, F_b)$" represents a geodesic distance between two precoders "$F_a$" and "$F_b$." The geodesic distance may be expressed as Equation 7 below.

$$d_{geo}(F_a, F_b) = \|\phi\|_2$$

where $$F_a^H F_b = U \cos(\Phi) V^H \quad [\text{Eqn. 7}]$$

$$\Phi = \operatorname{diag}\{\phi\}$$

According to the aforementioned precoder interpolation method using the SVD, an optimal precoder is not reflected in a precoder which is projected to a unitary matrix after being subjected to a linear interpolation. Also, according to the geodesic-based precoder interpolation method, when all streams are transmitted in a MIMO communication system (i.e., when the number of streams are the same as that of transmission antennas), the results of the calculation produce an equal value at all times because a used precoder corresponds to a unitary matrix, so that it is impossible to select an accurate precoder.

Meanwhile, the constant clustering scheme and the median clustering scheme have an advantage in that the schemes are simple and can be implemented with low complexity. However, according to the constant clustering scheme and the median clustering scheme, since a precoder representing a cluster is selected, without taking optimal precoders corresponding to other subcarriers in the cluster into consideration at all, the performance is degraded. Also, according to the Karcher mean clustering scheme, since a precoder of a unitary matrix is used when all streams are transmitted in a MIMO communication system, geodesic distances used to identify the optimal precoder representing a cluster are calculated to be an equal value at all times, it is impossible to select an accurate precoder.

Hereinafter, a method of selecting a precoder by using sums of minimum distances according to an exemplary embodiment of the present invention will be described.

According to the method of selecting a precoder by using sums of minimum distances, minimum distances between all symbol vectors, which can be received through the respective subcarriers included in a cluster by applying the respective precoders included in a codebook set, are calculated. A precoder producing the greatest sum of calculated minimum distances is selected from among the precoders, and the selected precoder is determined to be a precoder representing the corresponding cluster.

In detail, the receiver calculates minimum distances with respect to the respective subcarriers, as shown in Equation 8. Here, it is assumed that the receiver corresponds to an ML receiver.

$$d_{min,k}(F^j) = \min_{s_k^1, s_k^2 \in W^M : s_k^1 \neq s_k^2} \|H_k F^j (s_k^1 - s_k^2)\|_2 \quad [\text{Eqn. 8}]$$

In Equation 8, each of $s_k^1$ and $s_k^2$ represents a symbol vector among $W^M$ number of symbol vectors according to an M×1 multi-dimensional constellation, which is allocated to a $k^{th}$ subcarrier. Also, "M" represents the number of streams included in one symbol vector, and "W" represents the number of constellation points for one stream. For example, the "W" has a value of "4" in the case of quadrature phase shift keying (QPSK), a value of "8" in the case of 8PSK, and a value of "16" in the case of 16 quadrature amplitude modulation (16QAM). "$H_k$" represents a MIMO channel matrix of a $k^{th}$ subcarrier.

That is, Equation 8 is an equation for calculating a minimum distance between symbol vectors $s_k^1$ and $s_k^2$ by applying a $j^{th}$ precoder "$F^j$" among precoders in a codebook set with respect to a $k^{th}$ subcarrier among subcarriers included in a cluster.

The receiver calculates minimum distances "$d_{min,k}(F^j)$" according to subcarriers by using Equation 8, and adds minimum distances "$d_{min,k}(F^j)$" of subcarriers included in an $i^{th}$ cluster among minimum distances "$d_{min,k}(F^j)$" of all subcarriers, as shown in Equation 9.

$$F^i = \underset{F^j \in F}{\operatorname{argmax}} \sum_{k \in Cluster\, i} d_{min,k}(F^j) \quad [\text{Eqn. 9}]$$

In Equation 9, "$F^j$" represents a $j^{th}$ precoder among precoders included in the codebook set, "$d_{min,k}(F^j)$" represents minimum distances calculated by applying the precoder $F^j$ with respect to a $k^{th}$ subcarrier, and "$F^i$" represents a precoder representing the plurality of subcarriers.

As shown in Equation 9, the ML receiver adds minimum distances of subcarriers included in an $i^{th}$ cluster.

The ML receiver calculates sums of minimum distances of an $i^{th}$ cluster corresponding to each of precoders in a codebook set by using Equations 8 and 9, and selects the index of a precoder which produces the greatest sum of minimum distances. Then, the ML receiver determines the selected precoder index as a precoder (i.e., precoder $F^i$) representing the $i^{th}$ cluster. Here, the precoder index corresponds to an index representing a precoder.

The receiver includes a determination unit and a transmission unit. The determination unit calculates a minimum distance between the respective two symbol vectors with respect to the entire symbol vectors that can be received through a $k^{th}$ subcarrier, to which the channel state of the $k^{th}$ subcarrier among a plurality of subcarriers and a $j^{th}$ precoder among precoders included in a codebook set are applied, calculates sums of minimum distances by adding minimum distances calculated with respect to the plurality of subcarriers according to each precoder, and determines a precoder corresponding to a value greatest among the sums of minimum distances calculated with respect to the plurality of precoders, as a precoder representing the plurality of subcarriers. The transmission unit transmits the feedback information including the index of the determined precoder to the transmitter.

Hereinafter, a method in which an ML receiver selects a precoder by using sums of minimum distances and transmits feedback information including the index of the selected precoder in a MIMO communication system according to an exemplary embodiment of the present invention will be described with reference to FIG. 1.

FIG. 1 is a flowchart illustrating a method for transmitting feedback information by a receiver in an OFDM-based closed-loop MIMO communication system according to an exemplary embodiment of the present invention.

First, in step 101, the receiver calculates minimum distances between all symbol vectors that can be received according to subcarriers in a cluster to which the respective precoders included in a codebook set are applied, and then proceeds to step 103. In step 103, the receiver calculates sums of minimum distances by adding the calculated minimum distances according to each precoder and then proceeds to step 105. In step 105, the receiver selects a precoder corresponding to a value greatest among the sums of minimum distances and then proceeds to step 107. In step 107, the receiver transmits feedback information including an index of the selected precoder to a transmitter and terminates the procedure.

Hereinafter, a method for transmitting feedback information by a receiver in a MIMO communication system which has system environments described below according to an exemplary embodiment of the present invention will be described.

First, the system environments are as follows. A QPSK modulation scheme is employed, the receiver corresponds to an ML receiver, and the number of antennas is two. In addition, the total number of subcarriers is 64, and the number of subcarriers per cluster is four or eight. A codebook set includes 64 precoders, which correspond to discrete Fourier transform (DFT)-based precoders. In this case, when a symbol error rate is 1e-3 and the SNR of the receiver is 4 or 12, resultant values may be expressed as Table 1 below.

TABLE 1

| | 4 pilot precoder spacing (4 subcr. clustering) | | 12 pilot precoder spacing (12 subcr. clustering) | |
|---|---|---|---|---|
| | 4-tap | 12-tap | 4-tap | 12-tap |
| Full | 15.8 dB | 16.3 dB Full | 16.3 dB | 16.3 dB |
| Proj | 17.95 dB | 18.7 dB Proj | 18.65 dB | 19.35 dB |
| Interpol | | Interpol | | |
| Geodesic | 18.5 dB | 19.05 dB Geodesic | 18.95 dB | 19.4 dB |
| Const | 17.15 dB | 19.1 dB Const | 18.6 dB | 19.4 dB |
| Median | 17.1 dB | 18.8 dB Median | 18.1 dB | 19.3 dB |
| Min Dist | 16.2 dB | 17.65 dB Min Dist | 16.95 dB | 18.55 dB |

As shown in Table 1, the method according to present invention, in which a receiver calculates minimum distances, selects a precoder producing the greatest sum of calculated minimum distances, and feeds information about the selected precoder back to a transmitter, provides a symbol error rate (SER) closest to that provided by a method of obtaining and feeding the optimal precoders for all subcarriers back to a transmitter in the same data feedback environments, so that the method of selecting a precoder by using sums of minimum distances provides a higher performance than the conventional feedback schemes in an environment where the amount of data to be fed back is limited.

According to the present invention, in an OFDM-based closed-loop MIMO communication system, a receiver calculates minimum distances between all symbol vectors, which can be received, by applying each of precoders included in a codebook set with respect to the respective subcarriers, selects a precoder producing the greatest sum of calculated minimum distances from among the precoders, and feeds information about the selected precoder back to a transmitter, so that it is possible to minimize the degradation of system performance when the amount of resources for feedback channels is limited.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting feedback information by a receiver in a communication system, the method comprising the steps of:

calculating a minimum distance of each two symbol vectors among a plurality of symbol vectors which can be received through a $k^{th}$ subcarrier among a plurality of subcarriers, in which a channel state of the $k^{th}$ subcarrier and a $j^{th}$ precoder among a plurality of precoders included in a codebook set are applied;

calculating sums of minimum distances by adding minimum distances calculated for the plurality of subcarriers according to each precoder;

determining a precoder corresponding to a value greatest among the sums of minimum distances calculated according to the precoders, as a precoder representing the plurality of subcarriers; and feeding a feedback information including a precoder index of the determined precoder back to a transmitter.

2. The method as claimed in claim 1, wherein the minimum distance is calculated by an equation, $$d_{min,k}(F^j) = \min_{s_k^1, s_k^2 \in W^M : s_k^1 \neq s_k^2} \|H_k F^j (s_k^1 - s_k^2)\|_2,$$

where $F^j$ represents a $j^{th}$ precoder among the plurality of precoders included in the codebook set, M represents a number of streams included in one symbol vector, W represents a number of constellation points for one stream, $s_k^1$ and $s_k^2$ represent two symbol vectors, and $H_k$ represents a multiple input multiple output (MIMO) channel matrix representing the channel state of the $k^{th}$ subcarrier.

3. The method as claimed in claim 1, wherein the precoder representing the plurality of subcarriers is determined by an equation, $$F^i = \arg\max_{F^j \in F} \sum_{k \in Cluster\, i} d_{min,k}(F^j),$$

where "$F^j$" represents a $j^{th}$ precoder among the plurality of precoders included in the codebook set, $d_{min,k}(F^j)$ represents a minimum distance calculated by applying the precoder $F^j$ with respect to the $k^{th}$ subcarrier, and $F^i$ represents an $i^{th}$ precoder representing the plurality of subcarriers.

4. The method as claimed in claim 3, wherein the receiver corresponds to a maximum-likelihood (ML) receiver.

5. The method as claimed in claim 1, wherein the receiver corresponds to a maximum-likelihood (ML) receiver.

6. An apparatus for transmitting feedback information in a communication system, the apparatus comprising:
a determination unit for calculating a minimum distance of two symbol vectors among a plurality of symbol vectors which can be received through a $k^{th}$ subcarrier among a plurality of subcarriers, in which a channel state of the $k^{th}$ subcarrier and a $j^{th}$ precoder among a plurality of precoders included in a codebook set are applied, calculating sums of minimum distances by adding minimum distances calculated for the plurality of subcarriers according to each precoder, and determining a precoder corresponding to a value greatest among the sums of minimum distances calculated according to the precoders, as a precoder representing the plurality of subcarriers; and
a transmission unit for feeding a feedback information including a precoder index of the determined precoder back to a transmitter.

7. The apparatus as claimed in claim 6, wherein the determination unit calculates the minimum distance by an equation, $$d_{min,k}(F^j) = \min_{s_k^1, s_k^2 \in W^M : s_k^1 \neq s_k^2} \|H_k F^j (s_k^1 - s_k^2)\|_2,$$

where $F^j$ represents a $j^{th}$ precoder among the precoders included in the codebook set, M represents a number of streams included in one symbol vector, W represents a number of constellation points for one stream, $s_k^1$ and $s_k^2$ represent two symbol vectors, and $H_k$ represents a multiple input multiple output (MIMO) channel matrix representing the channel state of the $k^{th}$ subcarrier.

8. The apparatus as claimed in claim 6, wherein the determination unit determines the precoder representing the plurality of subcarriers by an equation, $$F^i = \arg\max_{F^j \in F} \sum_{k \in Cluster\, i} d_{min,k}(F^j),$$

where "$F^j$" represents a $j^{th}$ precoder among the precoders included in the codebook set, $d_{min,k}(F^j)$ represents a minimum distance calculated by applying the precoder $F^j$ with respect to the $k^{th}$ subcarrier, and $F^i$ represents an $i^{th}$ precoder representing the plurality of subcarriers.

9. The apparatus as claimed in claim 8, wherein the receiver corresponds to a maximum-likelihood (ML) receiver.

10. The apparatus as claimed in claim 6, wherein the receiver corresponds to a maximum-likelihood (ML) receiver.

11. A method for receiving feedback information by a transmitter in a communication system, the method comprising the steps of:
receiving a feedback information including a precoder index of a single precoder from among a plurality of precoders included in a codebook set, the precoder representing a plurality of subcarriers; and
performing a multiple input multiple output (MIMO) system using the single precoder,
wherein the single precoder is selected as the precoder representing the plurality of subcarriers by:
calculating a minimum distance of each two symbol vectors among a plurality of symbol vectors which can be received through a $k^{th}$ subcarrier among the plurality of subcarriers, in which a channel state of the $k^{th}$ subcarrier and a $j^{th}$ precoder among the plurality of precoders included in a codebook set are applied;
calculating sums of minimum distances by adding minimum distances calculated for the plurality of subcarriers according to each precoder; and
selecting a precoder corresponding to a value greatest among the sums of minimum distances calculated according to the precoders as a precoder representing the plurality of subcarriers.

12. The method as claimed in claim 11, wherein the minimum distance is calculated by an equation, $$d_{min,k}(F^j) = \min_{s_k^1, s_k^2 \in W^M : s_k^1 \neq s_k^2} \|H_k F^j (s_k^1 - s_k^2)\|_2,$$

where $F^j$ represents a $j^{th}$ precoder among the plurality of precoders included in the codebook set, M represents a number of streams included in one symbol vector, W represents a number of constellation points for one stream, $s_k^1$ and $s_k^2$ represent two symbol vectors, and $H_k$ represents a MIMO channel matrix representing the channel state of the $k^{th}$ subcarrier.

13. The method as claimed in claim 11, wherein the precoder representing the plurality of subcarriers is selected using an equation, $$F^i = \arg\max_{F^j \in F} \sum_{k \in Cluster\, i} d_{min,k}(F^j),$$

where "$F^j$" represents a $j^{th}$ precoder among the plurality of precoders included in the codebook set, $d_{min,k}(F^j)$ represents a minimum distance calculated by applying the precoder $F^j$ with respect to the $k^{th}$ subcarrier, and $F^i$ represents an $i^{th}$ precoder representing the plurality of subcarriers.

14. The method as claimed in claim 13, wherein the feedback information is received from a maximum-likelihood (ML) receiver.

15. The method as claimed in claim 11, wherein the feedback information is received from a maximum-likelihood (ML) receiver.

16. An apparatus for receiving feedback information in a communication system, the apparatus comprising:
a receiver for receiving a feedback information including a precoder index of a single precoder from among a plurality of precoders included in a codebook set, and performing a multiple input multiple output (MIMO) system using the single precoder, wherein the single precoder is selected as a precoder representing the plurality of subcarriers by:
calculating a minimum distance of each two symbol vectors among a plurality of symbol vectors which can be received through a $k^{th}$ subcarrier among the plurality of subcarriers, in which a channel state of the $k^{th}$ subcarrier and a $j^{th}$ precoder among the plurality of precoders included in a codebook set are applied;
calculating sums of minimum distances by adding minimum distances calculated for the plurality of subcarriers according to each precoder; and
selecting a precoder corresponding to a value greatest among the sums of minimum distances calculated according to the precoders as a precoder representing the plurality of subcarriers.

17. The apparatus as claimed in claim 16, wherein the minimum distance is calculated by an equation, $$d_{min,k}(F^j) = \min_{s_k^1, s_k^2 \in W^M ; s_k^1 \neq s_k^2} \|H_k F^j (s_k^1 - s_k^2)\|_2,$$

where $F^j$ represents a $j^{th}$ precoder among the plurality of precoders included in the codebook set, M represents a number of streams included in one symbol vector, W represents a number of constellation points for one stream, $s_k^1$ and $s_k^2$ represent two symbol vectors, and $H_k$ represents a MIMO channel matrix representing the channel state of the $k^{th}$ subcarrier.

18. The apparatus as claimed in claim 16, wherein the precoder representing the plurality of subcarriers is selected using an equation, $$F^i = \arg\max_{F^j \in F} \sum_{k \in Cluster\, i} d_{min,k}(F^j),$$

where "$F^j$" represents a $j^{th}$ precoder among the plurality of precoders included in the codebook set, $d_{min,k}(F^j)$ represents a minimum distance calculated by applying the precoder $F^j$ with respect to the $k^{th}$ subcarrier, and $F^i$ represents an $i^{th}$ precoder representing the plurality of subcarriers.

19. The apparatus as claimed in claim 18, wherein the transmitter receives the feedback information from a maximum-likelihood (ML) receiver.

20. The apparatus as claimed in claim 16, wherein the transmitter receives the feedback information from a maximum-likelihood (ML) receiver.

* * * * *